Inventor:
Edward J. Kingsbury,

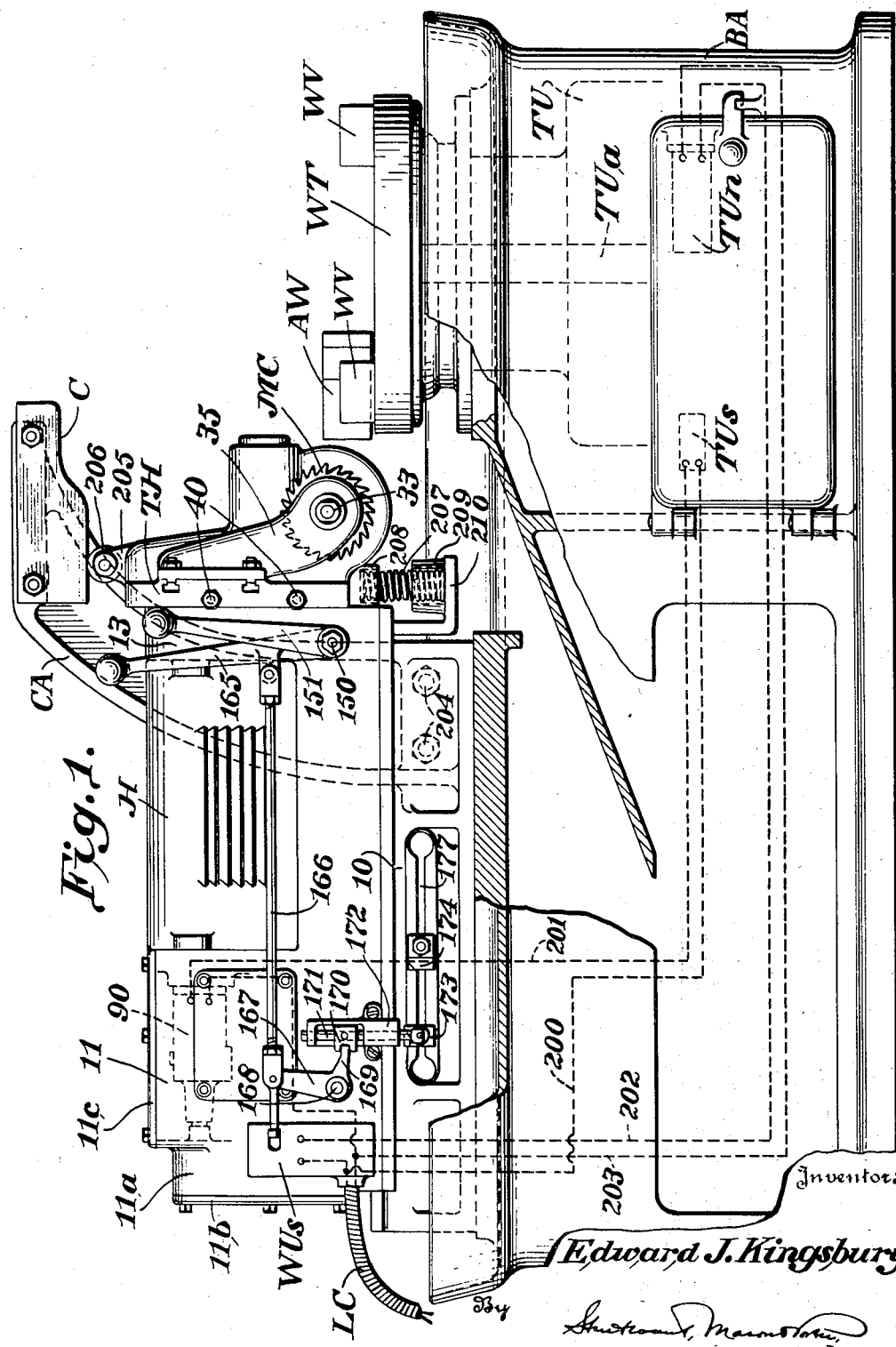

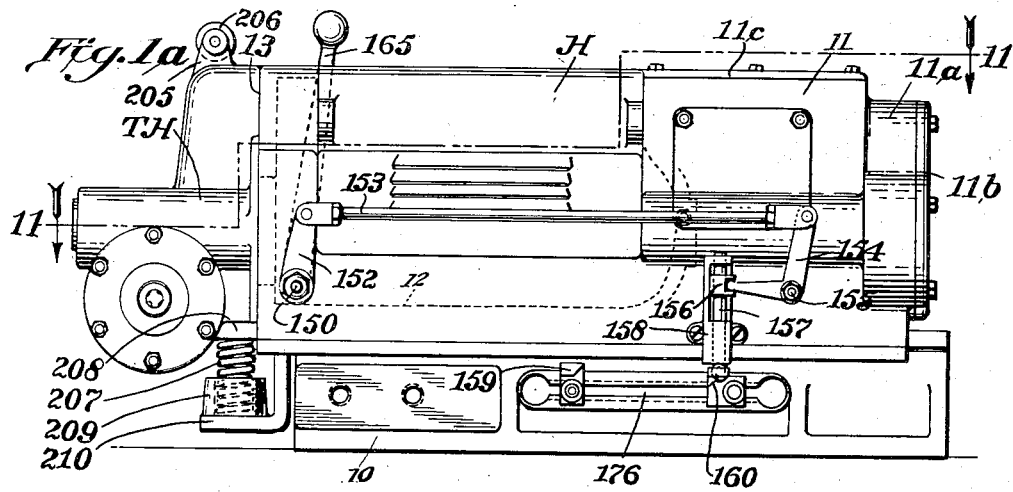
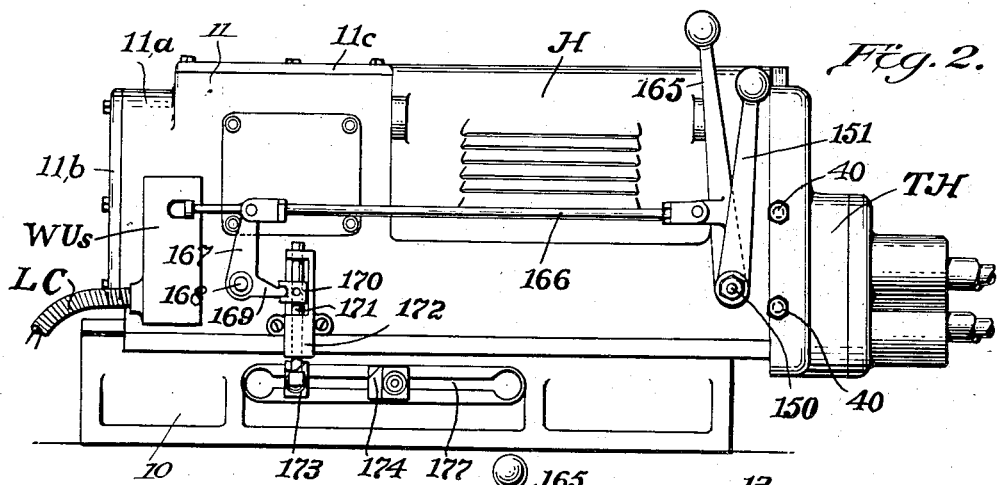
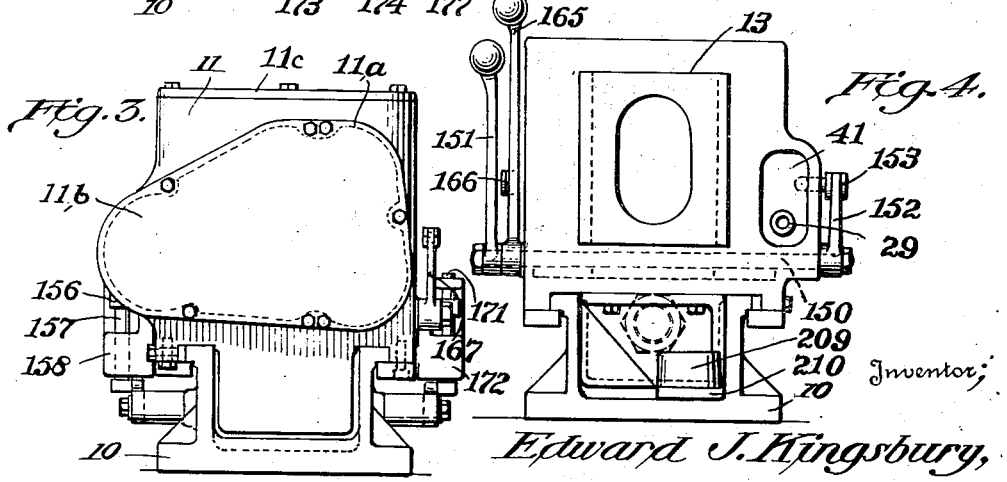

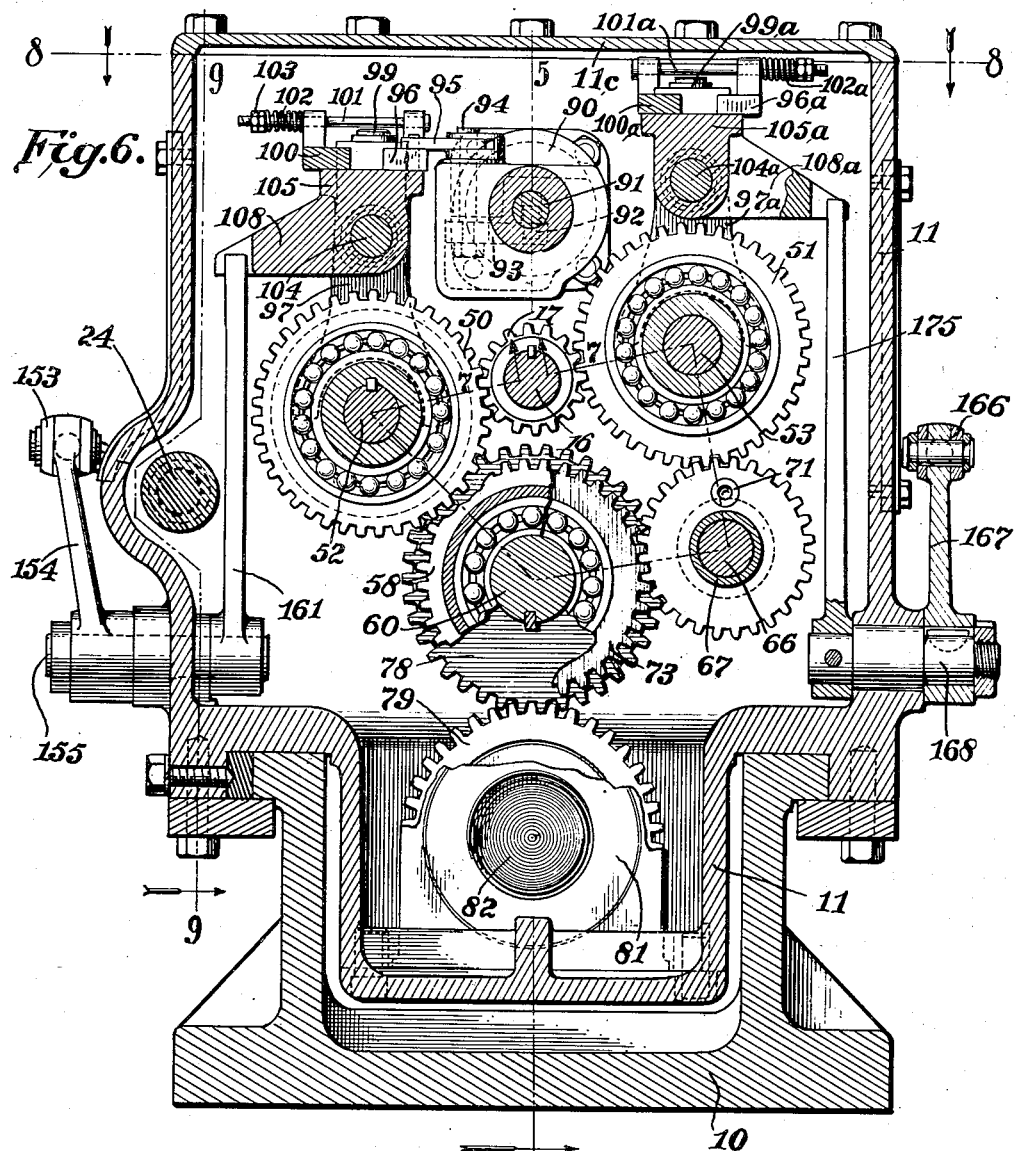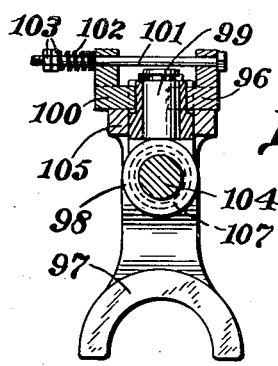

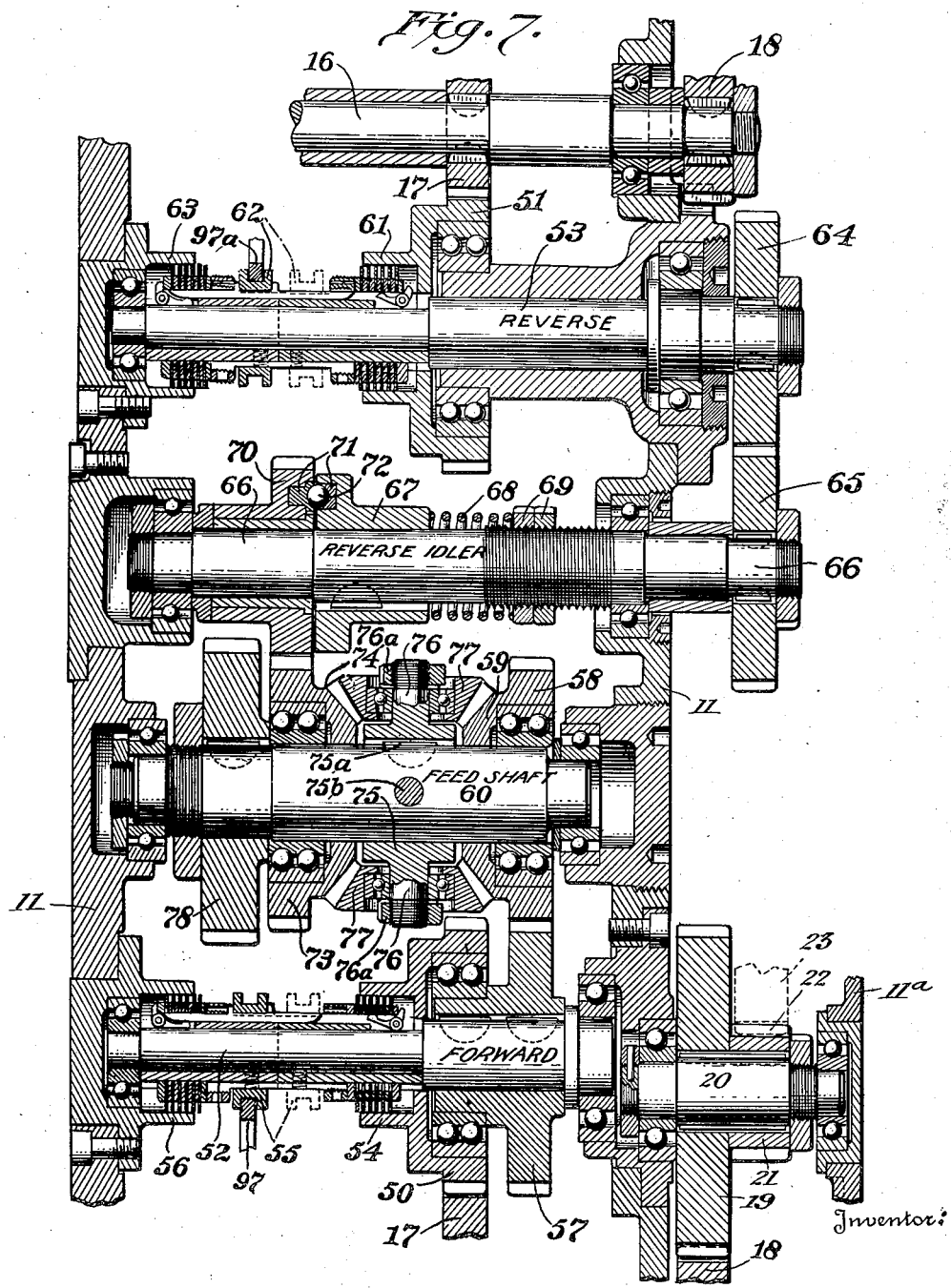

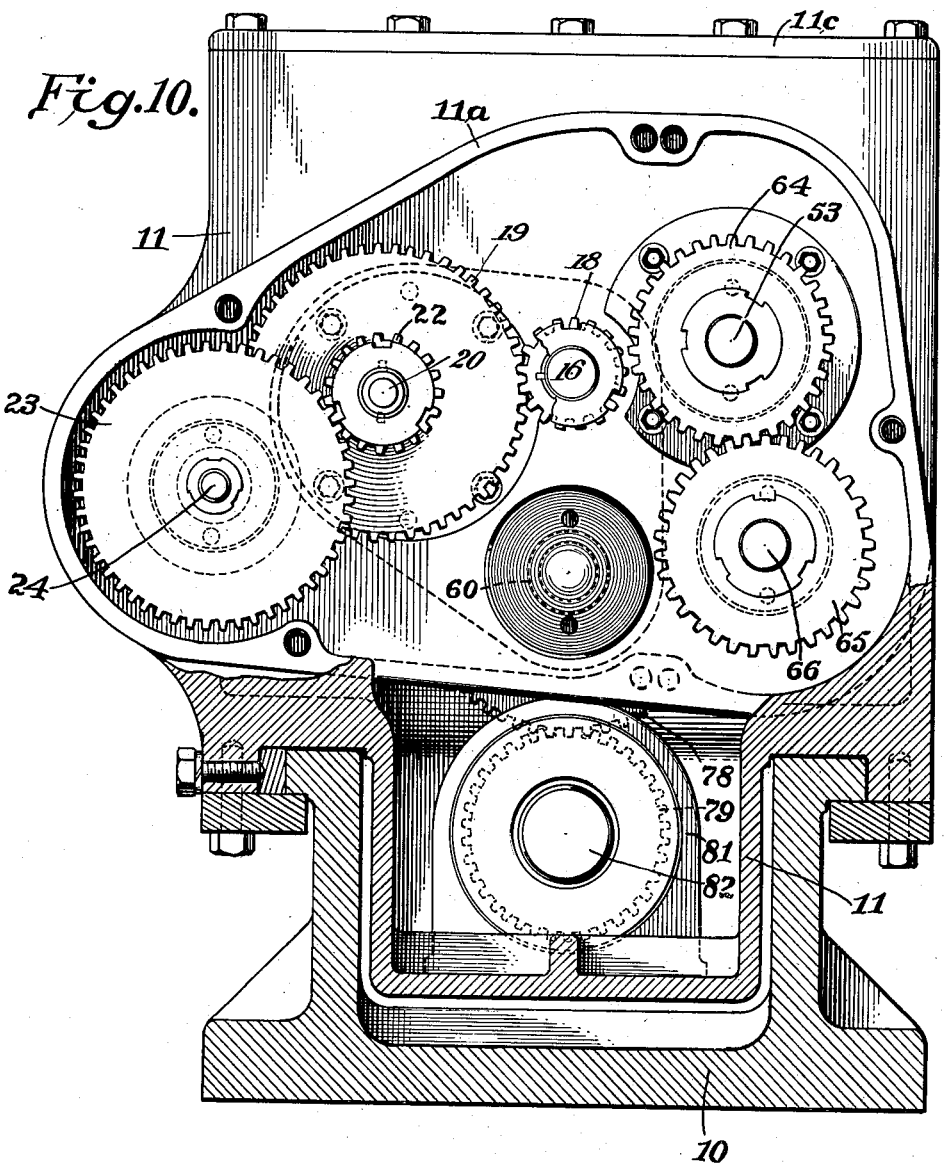

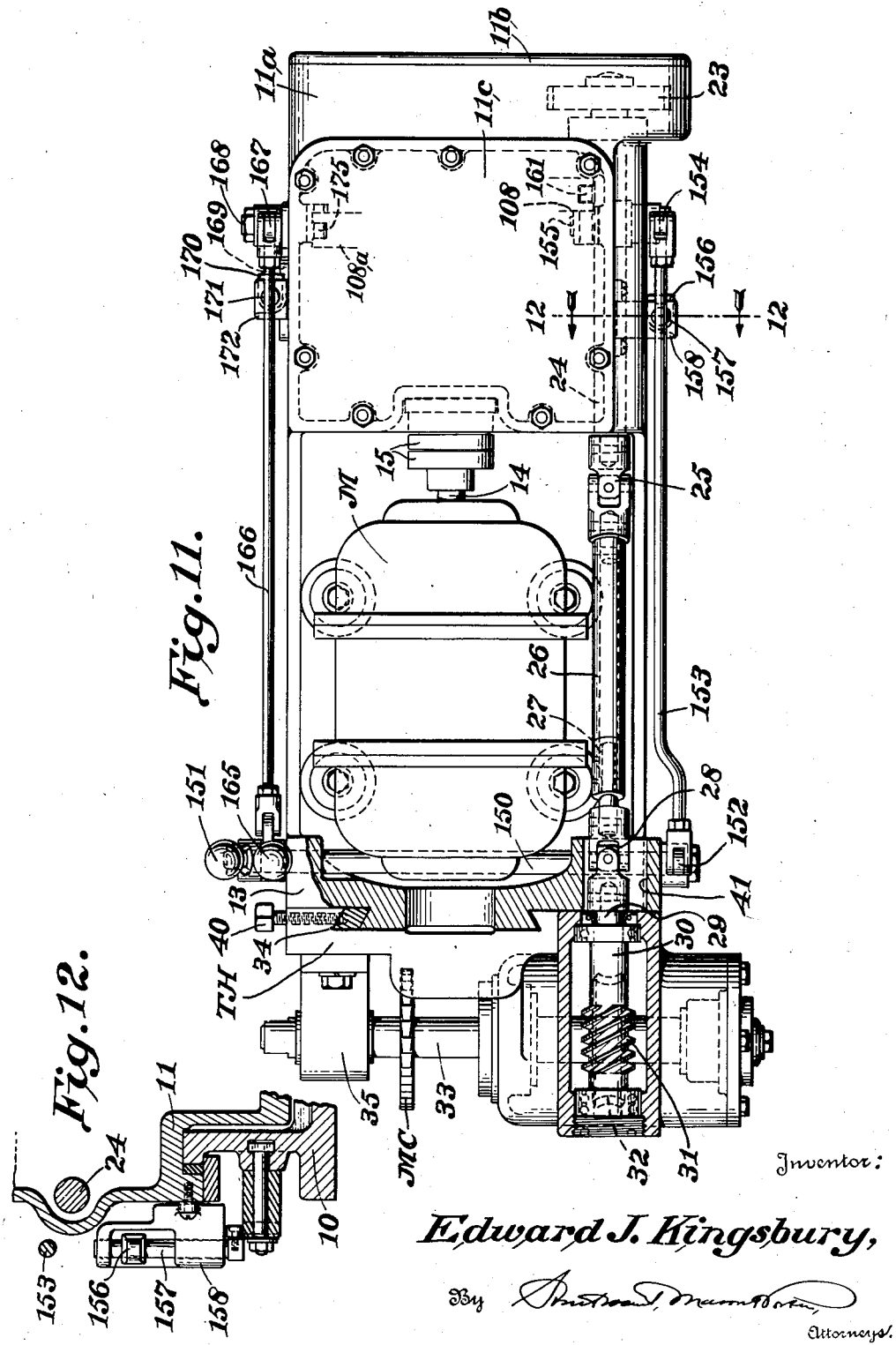

Patented Jan. 8, 1935

1,987,511

UNITED STATES PATENT OFFICE 1,987,511

MACHINE TOOL WITH AUTOMATICALLY OPERABLE FEEDING MECHANISM

Edward Joslin Kingsbury, Keene, N. H.

Application June 19, 1933, Serial No. 676,574

17 Claims. (Cl. 29—38)

This invention relates to machine tools, and is more particularly directed to such tools with automatically operable feeding mechanisms for controlling the forward and backward movements of the tool per se as it approaches the work, operates upon the work and is withdrawn from the work.

One of the features of the present invention is the provision of a compact assembly having therein the elements required for the operation of the structure, and including easily accessible shaft elements for pick-off gears which may be changed for controlling the operation of the structure, with the enclosure of all gear and like parts during normal operation.

Another feature of the present invention is the provision of a speed and feeding mechanism for receiving interchangeable tool units, whereby to rotate the tool for cutting and to feed the tool to, into and from the work, along with means for supporting the interchangeable tool unit so that it may be adjusted for accuracy of operation upon the work.

A further feature of the present invention is the provision of an automatic feed mechanism including an epicyclic gearing of which two members are driven and the third is connected to the feed effecting device per se, so that the controlled drive through the epicyclic gearing gives rapid forward and reverse traverse movements, the slow forward feeding movement, and permits a standstill of the moving structure between successive operations.

Still another feature of the present invention is the provision of an automatic feed mechanism having forward and reverse shafts driven from a single source of power, with the inclusion of an independent clutch system cooperating with said shafts and including elements which selectively and/or together connect the single source of power to the feed effecting device per se for producing rapid forward and reverse traverse movements, a slow forward feeding movement and a standstill of the parts.

Other features of the invention will appear in the course of the following specification and claims which describe the invention with respect to an illustrated form or embodiment thereof shown in the accompanying drawings, in which:

Figure 1 is a side elevation of the machine tool unit mounted on a base, and showing a control arm for the tool head.

Fig. 1a is an elevation of the machine tool from the opposite side, on the same scale.

Fig. 2 is a side elevation of the machine tool unit showing a double drilling head unit mounted thereon.

Fig. 3 is a rear elevation of the machine tool unit.

Fig. 4 is a front elevation of the machine tool unit, with the interchangeable tool head omitted for clearness.

Fig. 6 is a transverse upright section, on a slightly larger scale, substantially on line 6—6 of Fig. 5.

Fig. 7 is a view showing the relationship of the shafts and gears in the gear box, substantially on the broken line 7—7 of Fig. 6, with the shafts unfolded into a plane for clearness.

Fig. 10 is an upright transverse sectional view substantially on line 10—10 of Fig. 5.

Fig. 11 is a plan view, with parts broken away, substantially on line 11—11 of Fig. 1a, on a larger scale.

Fig. 12 is a detail sectional view substantially on line 12—12 of Fig. 11.

Fig. 14 is a detail view of one sliding member of a load-and-fire mechanism, illustrating further this device as shown in Fig. 6.

Figure 5:
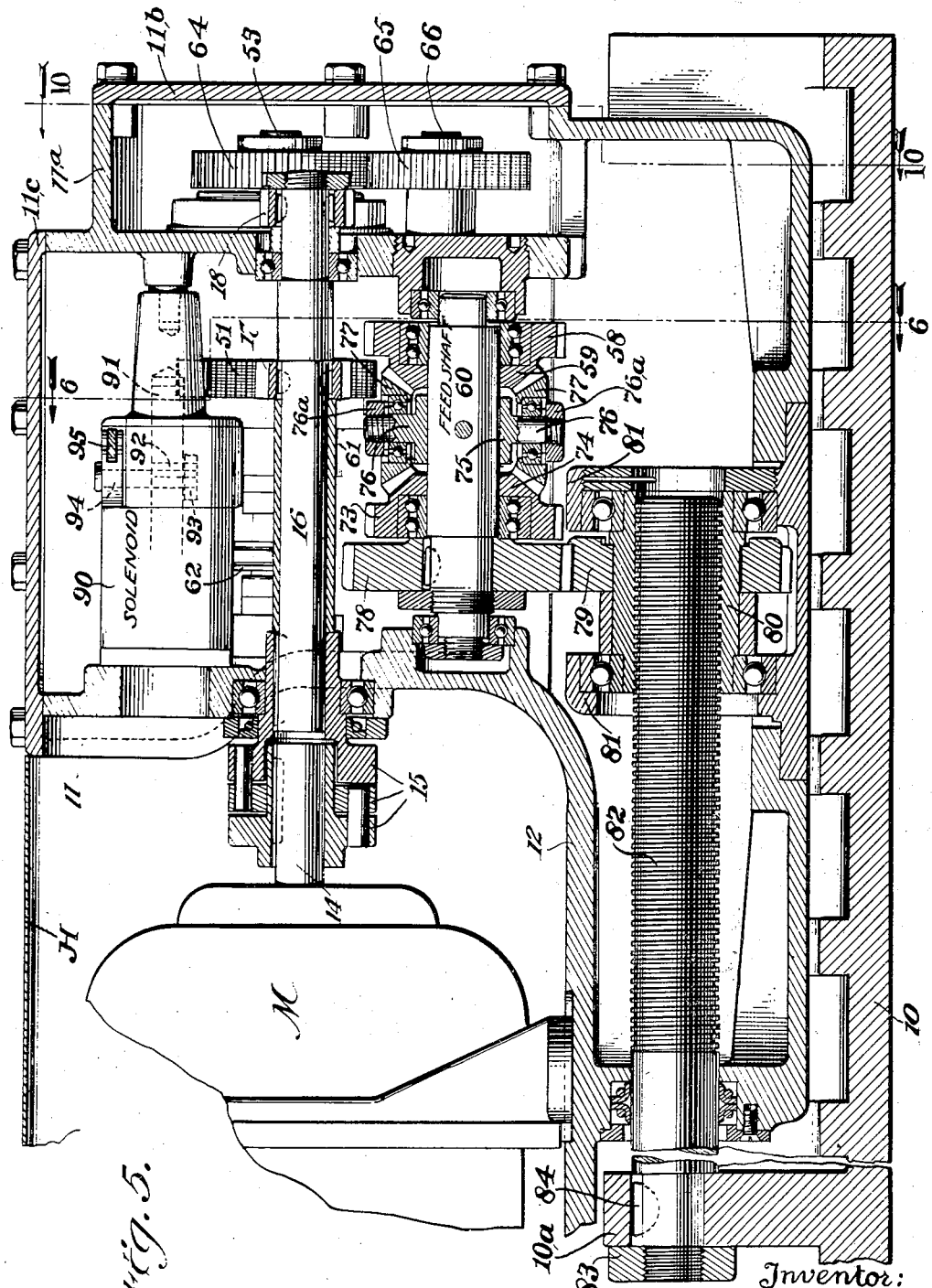
Fig. 5 is a longitudinal upright section of a portion of the tool unit taken substantially through the axis of the motor shaft, on a larger scale.
Figure 8:
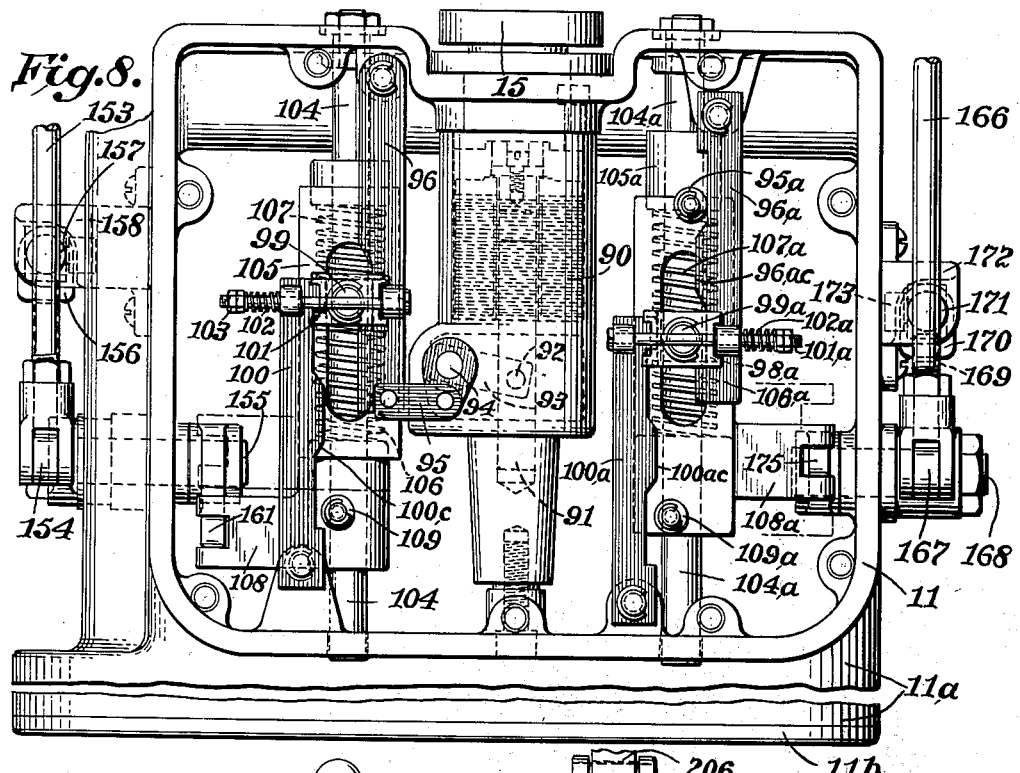
Fig. 8 is a horizontal sectional view substantially on line 8—8 of Fig. 6.

In the drawings, the structure is illustrated as comprising a fixed frame 10 which is to be secured to a standard opposite the work holder illustrated as a vise WV on a turret WT. The top of this fixed frame is provided with ways upon which may slide a carriage having a gear box 11 at its rear end (to the right in Fig. 1a), a platform 12 and an upright front panel 13 for receiving and supporting a tool head. A driving motor M (Fig. 5) is mounted upon the platform 12 and has a shaft 14 extended toward the gear box 11 and connected by a universal coupling 15 with the extended motor shaft 16 which is journaled in the gear box walls and has a gear 17 keyed thereto. A guard hood H normally covers the motor and extends between the gear box 11 and the panel 13.

Figure 9:
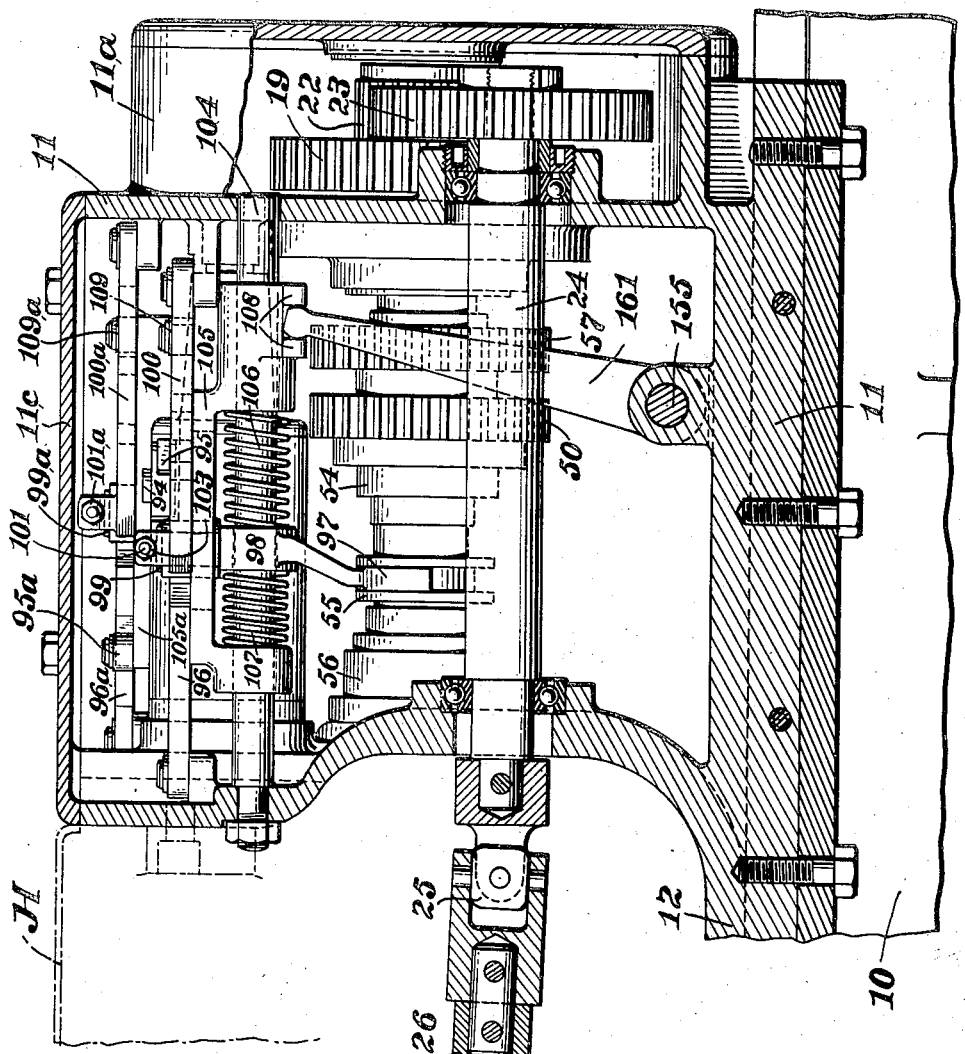
Fig. 9 is an upright sectional view substantially on line 9—9 of Fig. 6.

The driving connection for the operative tool in the interchangeable tool head is actuated from the extended motor shaft 16 through the gear 18 keyed on the end of this shaft and located within an extension 11a of the gear box, having a removable cover 11b, (Figs. 5 and 10). The gear 18 is in mesh with a large pick-off gear 19 carried by a stub shaft 20 fixed in the gear box wall, and the gear 19 is further connected by a sleeve 21 with a small pick-off gear 22 which is in mesh with a pick-off gear 23 on the end of the speed shaft fixed-axis portion 24 which is journaled in the gear box walls and extends through the forward wall and is connected, above the platform 12, through a universal joint 25 (Figs. 9 and 11) with the hollow swinging portion 26 of the speed shaft which is provided with internal grooves for receiving the splining keys of a speed shaft portion 27 so that the speed shaft portions 26 and 27 may telescope with respect to one another while swinging together in a vertical plane (Fig. 9). The speed shaft portion 27 is provided with a universal joint connection 28 by which it may be attached to the stub end 29 of the main driving shaft 30 carried in the interchangeable tool head. Thus in the milling cutter head shown in Figs. 1, 1a, 11 and 13, the main driving shaft 30 has a worm 31 thereon for driving a worm-wheel 32 carried by the arbor 33 for the milling cutter MC.

Figure 13:
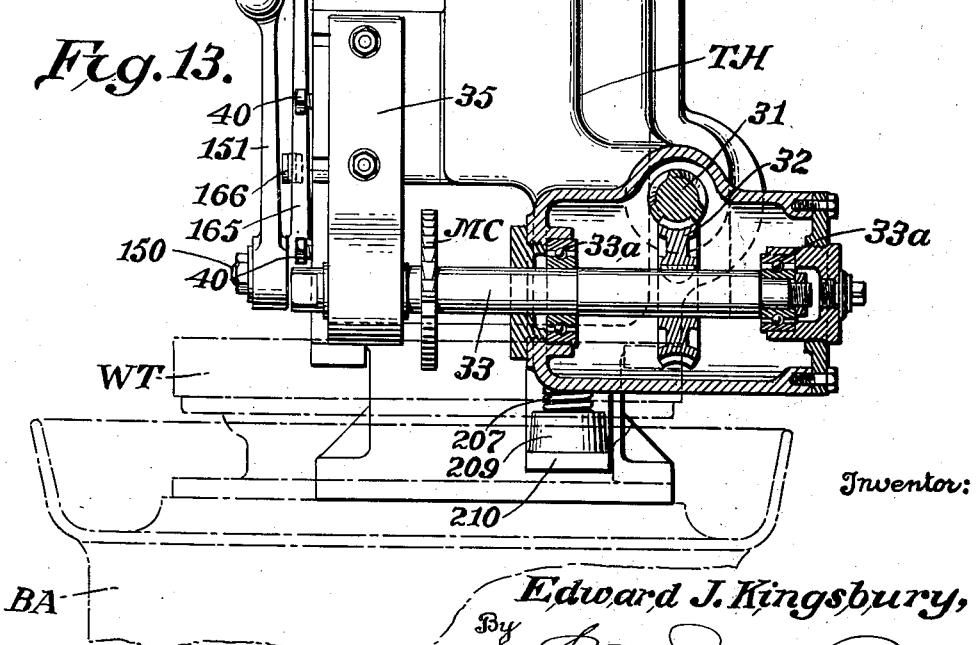
Fig. 13 is an end elevation, on a larger scale than that of Fig. 4, with a milling cutter head unit in position, with portions in section, and with a work turret illustrated in dot-and-dash lines.

As shown in Figs. 1a, 11 and 13, an outboard supporting bracket 35 is provided on the tool head TH for supporting the free end of the tool spindle, and may be adjustably mounted thereon as shown. Further, it is preferred to provide anti-friction bearings 33a in the tool head TH for the spindle 33 (Fig. 13).

Each interchangeable tool head TH fits the vertical ways on the front panel 13, and has a gib 34 so that the interchangeable unit may be adjusted up and down and locked in place by a clamping device 40. The front panel, to afford such adjustability, is provided with a slot 41 (Figs. 4 and 11) in which the connection 29 may move.

The employment of such a tool unit with a stand and a work turret is shown in Figs. 1 and 13. In Fig. 1, the device is also illustrated as including means for determining the shape of the bottom of a groove cut by a milling cutter MC carried by the tool head TH. A cam arm CA is secured by bolts 204 to the fixed base 10 and supports at its upper end a cam piece C having a conformed lower surface for engagement with a roller 206 carried by a bracket 205 on the tool head TH. This tool head is slidably mounted on the front panel 13 as by the dove-tailed slide illustrated in Fig. 11, and the gib 34 and its adjusting screws 40 are adjusted to permit a guided but free sliding vertical movement in this particular illustration. The roller 205 is maintained in engagement with the cam C by the action of a spring 207 which is received at its upper end in a cup 208 formed with the tool head TH and engages at its lower end in a corresponding cup 209 carried by a bracket 210 secured to the sliding carriage 11. In Fig. 1, also, a work turret WT is illustrated as rotatable with the work turret shaft TUa which is rotated through a fractional revolution at a proper time by a turret unit TU. This turret unit may be of the type described in my copending application, Ser. No. 683,541, filed August 3, 1933, to which further reference may be made as to particular structures involved. The operation of this unit is attained at the proper times by energization of the turret or indexing unit solenoid TUn through the conductors 202 and 203 under the control of a work unit switch WUs which is actuated with the link 166 and is closed when the carriage reaches its withdrawn position, current being supplied from a line cable LC. At the completion of the indexing movement, the turret unit closes a switch TUs and thus through conductors 200 and 201 energizes the solenoid 90 of the work unit as will be described hereinafter. On this turret WT are illustrated two work holders WV, one of which is in clamping relation to an article of work AW presented opposite the milling cutter MC.

In the form shown in Fig. 1, both the base 10 of the work unit and the parts of the indexing unit WT are supported by a common base BA.

By changing the pick-off gears 18, 19, 22 and 23, the desired speed of drive may be attained.

The gearing of the feeding mechanism is illustrated in Figs. 5, 6 and 7. The gear 17 on the extended motor shaft 16 is shown in Fig. 7 (showing the shafts unfolded into a plane) as engaged (bottom and top of figure) with the gears 50 and 51 which are loosely mounted for turning about the axes of the "forward" shaft 52 and the "reverse" shaft 53.

The gear 50 on the "forward" shaft 52 has a sleeve flange 54 constituting part of the first double clutch assembly which includes a shifting collar 55. When the collar 55 is in the dotted-line right-hand position in Fig. 7, the right-hand elements of the double clutch are engaged and the gear 50 is connected for driving the "forward" shaft 52. When the clutch collar 55 is in the left-hand full-line position of Fig. 7, the left-hand clutch elements are engaged and the "forward" shaft 52 is connected to a collar flange 56 on the fixed frame of the gear box 11 so that the shaft 52 is then held against rotation. The shaft 52 is carried in bearings in the gear box walls and has keyed to it a gear 57 which is in driving relationship with the "forward" gear 58 formed integrally with one bevel gear 59 of an epicyclic gearing and carried loosely for rotation about the axis of the driven feed shaft 60 which also is journaled in the gear box walls.

A second double clutch assembly is mounted on the "reverse" shaft 53 and includes a collar flange 61 on gear 51. The moving collar 62 of this second double clutch assembly, when in the right-hand dotted-line position of Fig. 7, holds the clutch elements within the flange 61 engaged so that the gear 51 is connected in driving relationship with the "reverse" shaft 53. When the movable collar 62 is in the full-line left-hand position of Fig. 7, the left-hand clutch elements are engaged and connect the "reverse" shaft 53 with a collar flange 63 fixed to the walls of the gear box 11, and thus prevent rotation of shaft 53. Shaft 53 extends through the rear wall of gear box 11 (Fig. 10) and is provided within the extension 11a with a pick-off gear 64 which is in mesh with a pick-off gear 65 on a reverse idler shaft 66 which is journaled in bearings carried by the walls of the gear box 11. A sleeve 67 is keyed on the reverse idler shaft 66 for rotation therewith, but has a permissive axial movement thereon, being forced toward the left by a feed-tension spring 68 which may be adjusted as to stress by nuts 69. A loose gear 70 may turn relative to the reverse idler shaft 66. The collar 67 and gear 70 are provided with wear members 71 between which is engaged a feed-tension clutch ball 72. So long as the reaction of the work upon the tool does not exceed a predetermined amount, the elements 70, 71, 72 remain together and the feeding continues: but when the reaction exceeds this amount, as determined by the stress in spring 68, the collar 67 moves toward the right, clutch ball 72 releases, and the two elements may rotate with respect to one another and thus prevent breakage in the parts. When the reaction drops to the predetermined value, the ball 72 soon enters the wear member 71 on gear 70 again and a normal drive is resumed.

Gear 70 is in mesh with the "reverse" gear 73 which is shown as formed integrally with a second bevel gear 74 of the epicyclic gearing, the two gears 73 and 74 being mounted loosely for rotation with respect to the axis of the feed shaft 60. Keyed on the feed shaft 60 by key 75a and pin 75b is a collar 75 having radially projecting pins 76 thereon and constituting the spider of the epicyclic gearing. These pins 76 rotatably support bevel gears 77 which together constitute the third gear element of the epicyclic gearing and are each in mesh with the bevel gears 59 and 74; nuts 76a prevent separation of the parts. The feed shaft 60 also has keyed thereto a spur gear 78 which (Figs. 5, 6 and 10) is in mesh with a gear 79 keyed on a nut 80 carried by bearings 81 for rotation with respect to the traveling carriage but held against axial movement with respect thereto. This nut 80 is engaged with a screw spindle 82 which is secured at its forward end in the upright portion 10a of the fixed frame by a nut 83 and a key 84 whereby the screw is prevented from rotation or translational movement with respect to the fixed frame. Thus, as the nut 80 turns in one or the other direction, it travels on the screw spindle 82 and causes feeding movements of the carriage with respect to the fixed frame 10.

The control mechanism for automatically operating the feeding devices includes a solenoid 90 having a movable armature 91. When the armature is attracted, the pin 92 thereof moves the arm 93 of a rock shaft 94 having an upper arm which causes an endwise movement of a connecting link 95, and thus a rocking movement of the trigger 96 of a "load and fire" mechanism which controls the operation of the double clutch on the "forward" shaft 52 (Figs. 6, 7, 8 and 9).

This "load and fire" mechanism includes the bifurcated arm 97 extending from the slider sleeve 98 which has an upstanding portion 99 which is engaged by trigger 96, and is held against movement in one direction toward the left or front in Fig. 9; (downward in Fig. 8), and is held against movement in the reverse direction by a second trigger 100. Upstanding lugs on the two triggers receive a tension rod 101 which is actuated by spring 102 held under adjustable stress by nuts 103. The tension rod 101 and its spring 102 moves the two triggers into engaging position. Slider sleeve 98 may move back and forth along a guide rod 104 mounted in the walls of gear box 11. The sliding pressure frame 105 has a slot which permits it to move relative to the upstanding portion 99, and has sleeves which guide it on the rod 104 so that it may alternately effect a compression of the "load and fire" springs 106, 107 which react upon the sleeve 98. This sliding pressure frame 105 also has a laterally projecting bifurcated piece 108 engaged with the arm 161 and operated thereby as described hereinafter. The pressure frame 105 also carries an upstanding member 109 which engages after a predetermined movement of the pressure frame in a forward direction (upward in Fig. 8) with a cam surface 100c on trigger 100 and causes this trigger to release the portion 99 and thus free the sleeve 98 so that spring 107 which has been compressed during the prior movement of the pressure frame 105 may quickly move the bifurcated arm 97 and therewith the clutch collar 55 toward the front of the gear box from the dotted-line into the full-line position of Fig. 7, and thus bring the "forward" shaft 52 to a standstill, in which condition it remains thereafter until released through the action of solenoid 90. A second "load and fire" mechanism is provided for the clutch collar 62 of the "reverse" shaft 53 and includes a pressure frame 105a which is slidable upon a guide rod 104a, operates to alternately compress the springs 106a, 107a, and has the bifurcated arm 108a for engagement by the lever arm 175. Trigger 96a operates to prevent movement of the upstanding portion 99a on a slider sleeve 98a which has a downwardly extending bifurcated arm 97a for engaging the clutch collar 62. The second trigger 100a prevents movement of the upstanding portion 99a in the opposite direction. The two triggers have cam surfaces 96ac and 100ac for engagement by the pins 95a and 109a carried by the pressure frame 105a. A rod 101a and spring 102a are employed for moving the triggers into engaging position.

Briefly described, the function of the "load and fire" mechanisms is as follows: movement of the arms 161 and 175 causes the pressure frames to induce compression of the springs 106, 107 and 106a, 107a, while the upstanding portions 99 and 99a are held latched by the triggers 96, 100 and 96a, 100a. Upon predetermined movements of the pressure frame 105 in one direction, and corresponding movements of the pressure frame 105a in either direction, the pins 109, 95a and 109a release corresponding triggers, so that the upstanding portion 99 or 99a is released and the clutch collar 55 or 62 is thrown rapidly from one end position to the other. However, the movement of the pressure frame 105 in the opposite direction does not result in such a release, as no corresponding pin is provided on the pressure frame for releasing the trigger 96. In this condition the connection of the mechanism is such that the carriage is brought to full return position, and the clutches are not thereafter released for permitting a further forward movement of the carriage with respect to the frame. Such a further forward movement can only be accomplished by energization of the solenoid 90 and therewith a movement of trigger 96 through link 95.

A transverse shaft 150 extends horizontally through the traveling carriage near the front thereof and is provided at one end (at the left, Fig. 4) with a short handle 151 keyed thereto for controlling the double clutch on the "forward" shaft 52. At the other end, the shaft 150 has a crank arm 152 connected to a link 153 extending rearwardly of the machine and connected to a bell crank 154 connected to a shaft 155 extending into the gear box 11 and having a substantially horizontal arm extending into a head 156 fixed to a plunger 157 carried by a guide 158 on the traveling carriage. The lower end of plunger 157 is moved downwardly by a dog 159 when the carriage reaches the adjusted forward limit of feeding movement and is moved upwardly by a dog 160 when the carriage reaches the rearward limit of the reverse feeding movement. Shaft 155 extends through the wall of gear box 11 (Fig. 6) and is provided within the gear box with a finger lever 161 which engages in the aforesaid piece 108 of the pressure frame 105 of the "load and fire" mechanism for the forward movement.

Similarly, a long handle 165 for controlling the double clutch on the "reverse" shaft 53 is loosely mounted around the shaft 150 adjacent the short handle 151 and is connected directly to a link 166 extending rearwardly to a bell crank 167 keyed to a shaft 168 which extends into the gear box 11 and includes externally of the gear box a horizontal arm 169 engaged in a head 170 of a second plunger 171 which is carried by a guide 172 on the moving carriage. This second plunger 171 is moved downwardly by engagement with a dog 173 on the fixed frame, at the end of the return movement of the carriage, and is moved upwardly by a dog 174 at the end of the rapid forward traverse movement of the carriage. On the end of shaft 168 within the gear box 11 is fastened a finger lever 175 which extends forwardly and engages in the forked head of the "forward" "load and fire" mechanism.

On the two sides of the fixed frame 10 are provided T-slots 176—177 in which the dogs 159, 160 and 173, 174 may respectively be adjusted to determine the limit of the rapid forward traverse feed movement, the slow forward feeding movement while the tool is engaged with the work, and the limit of return movement in the reverse traverse or withdrawal of the tool from the work.

It is possible by the handles 151 and 165 to stop or start the carriage as desired, after the cycle has been initiated through the solenoid 90 described hereinafter and except in the limit positions, so that the operator is always in control of the mechanism, while permitting the mechanism to automatically determine its movement in each cycle unless the operator supersedes this control.

A particular feature of the structure disclosed is the provision of a simple frame structure with a carriage moving thereon. The carriage supports the driving motor, all speed and feed mechanism, and the feed control mechanism is incorporated on the carriage and is associated merely with fixed feed-control dogs on the frame. The actual feeding movement is produced by a feed screw fixed to the frame and a traveling nut engaged with this feed screw and carried by the carriage in its feed movement. This traveling nut is driven by one movement of the epicyclic gearing of which the other two members are driven in forward and reverse directions at differing speeds, or are held at a standstill in order to produce successively the rapid forward feeding, the slow working forward feeding, and the rapid withdrawal or reverse feeding, as determined by the feed control mechanism. The self-contained nature of the device adapts it for employment in restricted spaces and for ready portability and easy connection in moving it from one location to another.

This self-contained nature of the structure includes also the provision of a sump which is located at a low point within the upstanding walls of the frame 10 and surrounds the portion of the feed screw 82 located within the carriage and engaged with the traveling nut. Thus adequate lubrication for the gear structures are provided through the action of the various gears in picking up and delivering from one to another the lubricant required for the proper operation of the system.

Through the use of the gear box extension 11a with its removable cover, the attendant can vary the rates of speed and feed through the removal and substitution of the pick-off gears as described.

It is obvious that the invention is not limited to the specific form of embodiments shown, but that it may be modified in many ways within the scope of the appended claims.

Having thus described the invention, what I claim as new and desire to secure by Letters Patent, is:

1. In an apparatus of the class described, a frame, a carriage movable on said frame, a shaft and driving means therefor, an epicyclic gearing having three members, means connected to a first said member for producing movement of said carriage with respect to said frame, forward driving means connected to said shaft and to a second said member for turning said first member in one direction and including a forward double clutch operative in one position for connecting said second member to said shaft and in another position for holding said second member at a standstill, reverse driving means connected to said shaft and to the third said member for producing movement of said first member in the other direction and including a reverse double clutch operative in one position to connect said third member to said shaft and in another position for holding said third member at a standstill, and control means actuated during the movement of said carriage with respect to said frame at predetermined positions during the movement thereof for controlling said double clutches and including devices for moving said reverse double clutch for holding said third member stationary and said forward double clutch for the driving of said epicyclic gearing and third member from said shaft whereby a rapid forward feeding movement is accomplished, and thereafter for engaging said reverse double clutch so that said second and third members are both driven from said shaft whereby a slow forward feeding is produced, and thereafter for actuating said forward double clutch for holding said second member at a standstill whereby the reverse driving means will produce a rapid withdrawal movement, and finally for operating said reverse clutch so that both said second and third members are held at a standstill and the movement of said carriage with respect to the frame is prevented.

2. In an apparatus of the class described, a frame, a carriage movable back and forth with respect to the frame for tool feeding, a tool holder movable on said carriage at an angle to the direction of said feeding movement, a motor supported by the carriage and moving therewith, a speed shaft means on the carriage driven from said motor and moving with said carriage and motor, tool driving means in said tool holder, and a speed shaft for connecting said motor and tool driving means and including universal joints and a telescoping connection for maintaining the drive of said tool driving means regardless of the position of said tool holder with respect to said carriage.

3. In an apparatus of the class described, a frame, a carriage movable back and forth with respect to the frame for tool feeding, a tool holder movable on said carriage at an angle to the direction of said feeding movement, a motor supported by the carriage and moving therewith, a speed shaft on the carriage driven from said motor and moving with said carriage and motor, tool driving means in said tool holder, a speed shaft for connecting said motor and tool driving means and including universal joints and a telescoping connection for maintaining the drive of said tool driving means regardless of the position of said tool holder with respect to said carriage, a cam fixed to the frame, cam-engaging means fixed to said tool holder, and means for maintaining said cam-engaging means in contact with said cam, said cam and cam-engaging means being operative during the feeding movement for presenting said tool holder at different positions with respect to an article of work.

4. An apparatus of the class described, including a tool unit and a work holding unit; said work holding unit including a turret and means for indexing the turret including a solenoid for releasing said indexing means for indexing movement and a switch actuated at the completion of the indexing movement; said tool unit including a frame and a carriage having feeding movement back and forth on said frame, means supported by the carriage for moving said carriage with respect to the frame, devices on the frame and carriage for controlling the feeding movement and including holding means for bringing the carriage to a standstill at the end of the predetermined cycle of movements in withdrawn position, a solenoid for releasing said holding means whereby to initiate a new cycle of movements, a switch closed when said carriage is in withdrawn position at the close of the cycle of movements, and circuit means for connecting said tool unit switch with said indexing unit solenoid and for connecting said indexing unit switch with said tool unit solenoid.

5. In an apparatus of the class described, a frame, a carriage having a feeding movement with respect to said frame, a motor supported on said carriage, a shaft driven by said motor, a forward shaft and a reverse shaft, a forward double clutch selectively operable for connecting said forward shaft to said driving shaft for producing a rotation of said forward shaft and for holding said forward shaft at a standstill, a load-and-fire mechanism for said forward clutch including a clutch operator, a pair of springs operative for moving said operator in opposite directions for a selecting movement of said operator, latching devices for preventing movement of said operator, means for selectively compressing said springs, means operated at a predetermined relative position of said carriage with respect to said frame for releasing one of said latching devices whereby to permit the movement of said forward clutch for holding said forward shaft at a standstill, and remotely controlled means for releasing the other of said latching devices whereby to effect the coupling of said forward shaft to said driving shaft.

6. A device as in claim 5, including a reverse double clutch selectively operable for coupling said reverse shaft to said driving shaft for the rotation of said reverse shaft and for coupling said reverse shaft to the carriage for preventing rotation of said reverse shaft, and a load-and-fire actuating mechanism for said reverse clutch including a clutch operator, a pair of springs for moving said operator, means for selectively compressing said springs, reverse latching devices for preventing movement of said reverse clutch operator, and devices operated by the carriage in its movement at predetermined relative positions of said carriage and frame for releasing said reverse latching devices whereby said reverse shaft is connected to said driving shaft when the tool has approached the work and is disconnected from said driving shaft when the carriage has attained a predetermined withdrawn position with respect to said frame.

7. In an apparatus of the class described, a frame, a carriage movable on said frame for feeding a tool, a feed screw fixed to said frame, a traveling nut engaged with said screw and carried in movement with said carriage, a driving motor on said carriage, feed connections mounted on said carriage between said motor and said traveling nut including a forward driving mechanism and a reverse driving mechanism, and feed control means mounted on said carriage for selecting the operation of said forward and reverse feeding mechanisms, and dogs fixed on said frame for actuating said feed control means.

8. In an apparatus of the class described, a frame, a carriage movable back and forth with respect to the frame for tool feeding, a guide on one end of said carriage at an angle to the direction of carriage movement, a tool holder movable on said guide with respect to said carriage, speed transmission devices attached to the opposite end of said carriage, a motor supported by said carriage and operatively connected to said speed transmission devices, tool driving means in said holder, an operating connection between said tool driving means and said speed transmission devices, and including devices for maintaining the drive of said tool driving means regardless of the position of said tool holder with respect to said carriage.

9. An apparatus as in claim 8, including a device for imparting movement to the tool holder along said guide as the carriage is moved back and forth.

10. An apparatus as in claim 8, including feed transmission mechanism for imparting a forward and backward feeding movement to the carriage relative to said frame.

11. An apparatus as in claim 8, including feed transmission mechanism for imparting a forward and backward movement to the carriage, and devices controlled by the movement of the carriage for operating the feed mechanism to vary the rate and direction of feed.

12. In an apparatus of the class described, a frame, a carriage slidably mounted on said frame, feeding means connected to the carriage and frame for moving the carriage back and forth on the frame for tool feeding, a tool holder attached to one end of said carriage, speed and feed transmission devices attached to the opposite end of said carriage and including shaft ends accessible at said opposite end and having intermeshing and exchangeable gears thereon, a motor supported by said carriage and operatively connected to said speed and feed transmission devices, tool driving means in said holder, a driving connection between said speed transmission devices and said tool driving means, and a driving connection between said feed transmission devices and said feeding means.

13. In an apparatus of the class described, a work unit including a frame and a carriage movable on said frame, a shaft and driving means therefor, means operated by said shaft for imparting back and forth movements to said carriage including an epicyclic gearing having three members rotating about a common axis, means connected to a first said member for producing movement of said carriage with respect to said frame, forward driving means connected to said shaft and to a second said member for turning said first member for moving said carriage in one direction, reverse driving means connected to said shaft and to the third said member for turning said first member for moving the carriage in the other direction and at a slower speed, said forward driving means and said reverse driving means being simultaneously operable on said first member for producing a slow forward feeding movement to said carriage, and control means actuating during the movement of the carriage with respect to the frame for controlling the forward and reverse driving means.

14. In an apparatus of the class described, a work unit including a frame, a carriage movable on said frame, an actuating shaft, driving means therefor, a feed shaft for imparting back and forth movements to said carriage, an epicyclic gearing mounted for rotation about the axis of said feed shaft and including a spider keyed to said feed shaft, a series of bevel gears mounted on said spider for rotation about axes at right angles to the axis of the feed shaft, a bevel gear at each side of said spider meshing with the bevel gears on said spider and mounted for free rotation on said shaft, clutch means for connecting one of said bevel gears selectively to the actuating shaft for rotating the same in a forward direction or to a fixed member for preventing rotation thereof, clutch means for connecting the other of said bevel gears through a reverse drive selectively to said shaft for rotation in a reverse direction and at a slower speed, or to a fixed member for holding the same from rotation, and a control means actuated by the movement of the carriage for controlling said clutches whereby said forward rotating bevel gear may drive the feed shaft for rapidly traversing the carriage, and whereby the reverse bevel gear may drive said feed shaft for the reverse feed of the carriage, and whereby both of said bevel gears may operate simultaneously on said feed shaft for producing a slow turning movement of the feed shaft.

15. In an apparatus of the class described, a work unit including a frame and a carriage movable on said frame, a shaft and driving means therefor both supported by and moved with said carriage, a feed screw element, a cooperating nut element, one of said elements being fixed to the frame and the other of said elements being rotatable upon and held against endwise movement with respect to the carriage, an epicyclic gearing supported by and moved with said carriage and having three members, means connected to a first said member for rotating the other said element for producing movement of said carriage with respect to said frame, forward driving means connected to said shaft and to a second said member for turning said first member in one direction, reverse driving means connected to said shaft and to the third said member for producing movement of said first member in the other direction, and control means actuated during the movement of said carriage with respect to said frame for controlling said forward and reverse driving means.

16. In an apparatus of the class described, a work unit including a frame and a carriage movable on said frame, a shaft and driving means therefor both supported by and moved with said carriage, an epicyclic gearing supported by and moved with said carriage and having three members, means connected to a first said member for producing movement of said carriage with respect to said frame, forward driving means connected to said shaft and to a second said member for turning said first member in one direction, reverse driving means connected to said shaft and to the third said member for producing movement of said first member in the other direction, said reverse driving means having a lesser speed ratio of connection than said forward driving means whereby the simultaneous operation of said second and third members will produce a slow forward feeding of the carriage with respect to the frame, said control means including devices for maintaining both said forward and reverse driving means in operation simultaneously during a portion of the forward movement of the carriage with respect to the frame, feed control means mounted on said carriage for selecting the operation of said forward and reverse feeding mechanisms, and dogs fixed on said frame for actuating said control means.

17. In an apparatus of the class described, a work unit including a frame and a carriage movable on said frame, a shaft and driving means therefor both supported by and moved with said carriage, an epicyclic gearing supported by and moved with said carriage and having three members, means connected to a first said member for producing movement of said carriage with respect to said frame, forward driving means connected to said shaft and to a second said member for turning said first member in one direction, reverse driving means connected to said shaft and to the third said member for producing movement of said first member in the other direction, both said driving means comprising double clutches each of which operates in one position to connect the corresponding member to said shaft and in another position to connect the corresponding member to said carriage for holding said corresponding member at a standstill, and control means actuated during the movement of said carriage with respect to said frame for controlling said forward and reverse driving means.

EDWARD JOSLIN KINGSBURY.